(12) United States Patent
Matsumoto

(10) Patent No.: US 7,907,763 B2
(45) Date of Patent: Mar. 15, 2011

(54) IMAGE PROCESSING METHOD AND COMPUTER READABLE MEDIUM FOR IMAGE PROCESSING

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 0 days.

(21) Appl. No.: 12/703,285

(22) Filed: Feb. 10, 2010

(65) Prior Publication Data

US 2010/0141675 A1     Jun. 10, 2010

Related U.S. Application Data

(63) Continuation of application No. 11/531,390, filed on Sep. 13, 2006, now Pat. No. 7,706,588.

(30) Foreign Application Priority Data

Sep. 14, 2005   (JP) ................................ 2005-267229

(51) Int. Cl.
    *G06K 9/00*          (2006.01)
    *G06T 15/40*         (2006.01)
    *G09G 5/02*          (2006.01)

(52) U.S. Cl. ......................... 382/128; 345/421; 345/589

(58) Field of Classification Search .......... 382/128–134, 382/162, 235, 307; 378/4, 21–28, 46, 90, 378/92, 101, 140, 901; 345/421, 589
See application file for complete search history.

(56) References Cited

U.S. PATENT DOCUMENTS 6,741,672 B2 *   5/2004   Gaddipati et al. ................ 378/4
6,930,706 B2 *   8/2005   Kobayashi et al. ............. 348/65

FOREIGN PATENT DOCUMENTS

| JP | 05-050782 | 3/1993 |
| JP | 2000-057359 | 2/2000 |
| JP | 2000-099695 | 4/2000 |
| JP | 2001-109831 | 4/2001 |
| JP | 2004-302882 | 10/2004 |

* cited by examiner

*Primary Examiner* — Abolfazl Tabatabai
(74) *Attorney, Agent, or Firm* — Pearne & Gordon LLP

(57) ABSTRACT

When the user presses an Alt key, the mode makes a transition to a property value switching mode and all annotations are made visible. At this time, the originally invisible annotations with the visibility properties set to invisible are drawn translucently. That is, a scanner name, a color bar, and a patient name which are not visible in a normal mode are drawn translucently. Thus, the user presses the Alt key, whereby the mode can be switched to the visible switching mode of drawing all objects, so that the user can promptly designate the annotation whose visibility property is to be changed and can smoothly conduct a medical diagnosis with an image.

14 Claims, 11 Drawing Sheets

SETTING IN DIALOG BOX

| ☒ PATIENT NAME | ☐ SCANNER NAME | ☐ RULER |
| ☐ DIRECTION INDICATION 1 | ☒ RADIATION INTENSITY | ☒ DIRECTION INDICATION 2 |
| ☒ COLOR BAR 1 | ☒ COLOR BAR 2 | ☒ COLOR BAR 3 |

OK | CANCEL

SETTING ON MENU

IMAGE PROCESSING METHOD AND COMPUTER READABLE MEDIUM FOR IMAGE PROCESSING

This application is a continuation of U.S. patent application Ser. No. 11/531,390 filed Sep. 13, 2006, which is incorporated herein by reference in its entirety.

This application claims foreign priority based on Japanese Patent application No. 2005-267229, filed Sep. 14, 2005, the content of which is incorporated herein by reference in its entirety.

BACKGROUND OF THE INVENTION

1. Field of the Invention

This invention relates to an image processing method and a computer readable medium for image processing, for displaying a medical image including a plurality of objects each having a visibility property of at least visible or invisible.

2. Description of the Related Art

A revolution is brought about in the medical field with the advent of a CT (Computed Tomography) apparatus and an MRI (Magnetic Resonance Imaging) apparatus making it possible to directly observe the internal structure of a human body as the image processing technology using a computer moves forward; medical diagnosis using the tomographic image of a living body is widely conducted. While, three-dimensional structure inside of a human body is hard to understand simply from the tomographic image of a human body. Further, in recent years, as a technology for visualizing the complicated three-dimensional structure has advanced, for example, volume rendering for directly rendering an image of the three-dimensional structure from three-dimensional digital data of an object provided by a CT apparatus has been used for medical diagnosis.

FIG. 7 shows a screen displaying a scanned image and annotations superposed on the image for displaying task states, conditions, etc., of the image in a medical image processing apparatus. The screen in FIG. 7 displays a visualized scanned image 10 (in this case, chest) and its annotations, namely, a scanner name 11, a color bar 12 for associating brightness and color of the image with a physical value, X-Ray intensity at the exposure time and a slice interval 13, scanned patient name, age, and scanning date 14, a ruler 15 for determining the physical size of the image, a direction indication 16 for indicating the image orientation, and a window level WW/WL (image contrast) 17.

However, all annotations are not necessarily required in a specific diagnosis and thus some annotations can be set invisible. In this case, hitherto, it has been a common practice to set the visibility property of annotation to visible or invisible in a dialog box or on a menu.

FIG. 8 shows the case where the visibility properties of annotations are set in a dialog box. The patient name, radiation intensity, direction indication 2, color bars 1, 2, and 3 are checked in the dialog box shown in FIG. 8, whereby the visibility properties of the annotations can be set to visible. The checks are removed, whereby the visibility properties of the annotations can be set to invisible.

FIG. 9 shows the case where the visibility properties of annotations are set on a menu. Ruler and color bar are checked on an auxiliary menu of a pull-down menu shown in FIG. 9, whereby the visibility properties of the annotations can be set to visible. The checks are removed, whereby the visibility properties of the annotations can be set to invisible.

FIG. 10 shows a state in which some annotations are set visible in accordance with the setting of the dialog box or the menu. That is, FIG. 10 shows a state in which the radiation intensity 13, the ruler 15, the direction indication 16, and the window level indication 17 as the annotations are superposed on the image 10 to be diagnosed (the visibility properties are set to visible).

FIG. 11 is a flowchart to describe switching processing of such annotations. In an image processing method in a related art, when the user issues a request for changing an annotation to be made visible, first a dialog box for entering the type of annotations that can be made visible is shown (step S21). Here, the user sets the type of an annotation to be made visible in the dialog box (step S22). Accordingly, the setup annotation is made visible (step S23).

Thus, hitherto, when switching annotations to be made visible or invisible, it has been necessary to change the setting in the dialog box or on the menu, and the operation has been troublesome. Particularly, when the user cannot picture or recall the annotation from icons or texts, those annotations can never be used.

Furthermore, the correspondence between annotations and icons or texts in the dialog box is non intuitive. The awkwardness finding suitable annotations lead to poor usability. Particularly, in a medical diagnosis, often, different annotations are used for different types of medical image so that a large number of types of annotations exist and thus the dialog box and the menu become enormous and calling the dialog box or the menu on another screen takes much time and operation is cumbersome.

SUMMARY OF THE INVENTION

The present invention has been made in view of the above circumstances, and provides an image processing method and a computer readable medium for image processing for enabling the user to switch between visible and invisible of each object of a medical image including a plurality of objects with good operability.

In some implementations, an image processing method of the invention comprises:

displaying a medical image including a plurality of objects each having a visibility property which value can be at least visible or invisible;

switching a mode from a normal mode in which the object is drawn in accordance with the visibility property, to a property value switching mode in which the object is drawn regardless of the visibility property;

accepting designation of any of the objects in the property value switching mode; and switching the visibility property of the designated object.

According to the described configuration, the user presses an Alt key, for example, whereby the mode is switched from the normal mode in which the objects are drawn in accordance with the visibility property to the property value switching mode in which the objects are drawn regardless of the visibility property value, and the user designates any object with a pointing device, etc., whereby the visibility property value of the object can be switched between visible and invisible, so that the user need not call a dialog box or a menu to change the visibility property value of each object and to conduct a medical diagnosis while seeing the image, the user can switch the object between visible and invisible with good operability. Particularly, the drawing position of each object can be made the same regardless of the visibility property of the object, so that it becomes easy to keep track of and designate the objects.

In the image processing method of the invention, the designation of the object in the property value switching mode is performed with a pointing device.

In the invention, the objects include an annotation. The objects include an image operation GUI (graphical user interface). The objects include an image diagnosis object.

In the image processing method of the invention, while a predetermined key is held down, the mode is kept in the property value switching mode. In the image processing method of the invention, the mode is switched between the property value switching mode and the normal mode each time a predetermined key is pressed down. In the image processing method of the invention, the mode is switched between the property value switching mode and the normal mode according to an input through a GUI.

According to the described configuration, the user can switch the mode between the normal mode and the property value switching mode by a single operation such as pressing a predetermined key, so that to conduct a medical diagnosis while seeing the image, the user can easily designate the object whose visibility property value is to be switched between visible and invisible.

In the image processing method of the invention, during the property value switching mode, the objects are drawn by being distinguished from each other according to the visibility property value. In the image processing method of the invention, each of the objects is drawn in a degree of transparency according to the visibility property value. In the image processing method of the invention, each of the objects is drawn in a color according to the visibility property value. In the image processing method of the invention, each of the objects is drawn in a size according to the visibility property value.

According to the described configuration, during the property value switching mode, the objects are drawn so that they are distinguished from each other according to the setup visibility property value. Thus, to conduct a medical diagnosis while seeing the image, the user can easily find out the object whose visibility property value is to be switched.

In some implementations, a computer readable medium of the invention having a program including instructions for permitting a computer to perform image processing, the instructions comprising:

displaying a medical image including a plurality of objects each having a visibility property which value can be at least visible or invisible;

switching a mode from a normal mode in which the object is drawn in accordance with the visibility property value, to a property value switching mode in which the object is drawn regardless of the visibility property;

accepting designation of any of the objects in the property value switching mode; and switching the visibility property value of the designated object.

According to the invention, the user presses down the Alt key, for example, whereby the mode is switched from the normal mode of drawing the objects in accordance with the visibility property value to the property value switching mode of drawing the objects regardless of the visibility property value, and the user designates any object with a pointing device, etc., whereby the visibility property value of the object can be switched between visible and invisible, so that the user need not call the dialog box or the menu to change the visibility property value of each object and to conduct a medical diagnosis while seeing the image, the user can switch the object between visible and invisible with good operability.

DESCRIPTION OF THE PREFERRED EMBODIMENTS

An image processing method according to an embodiment of the invention enables the user to switch between visible and invisible of each object with good operability in a medical image made up of a plurality of objects (image, annotation, GUI, etc.,) each having at least a visibility property value of visible and invisible.

The image processing method of the embodiment enables the user to switch a mode from a normal mode to property value switching mode. In normal mode, objects whose visibility property is set to visible are drawn. And, in property value switching mode, all objects are drawn regardless of the visibility property. To switch from the normal mode to the property value switching mode, the user may press Alt key, for example.

In the property value switching mode, the objects whose visibility property is set to visible are drawn opaquely and the objects whose visibility property is set to invisible are drawn translucently, for example. Accordingly, the user can precisely recognize and modify the current visibility property values of the objects while easily keeping track of the appearance of all objects.

To change the visibility property of an object, the user designates the object with a pointing device such as a mouse in the property value switching mode. Accordingly, the visibility property of the designated object is switched. That is, if the visibility property of the object is invisible (the object is drawn translucently in the property value switching mode), the visibility property is changed to visible, and if the visibility property of the object is visible (the object is drawn opaquely in the property value switching mode), the visibility property is changed to invisible.

Accordingly, the user need not call a dialog box or a menu to change the visibility property of each object, and the user can switch the object between visible and invisible with good operability when conducting a medical diagnosis while seeing a medical image.

Example 1

Next, the image processing method of the embodiment will be discussed in detail with reference to the accompanying drawings. In the normal mode of the image processing method of the embodiment, annotations whose visibility property is visible are drawn and annotations whose visibility property is invisible are not drawn. The user can also set the visibility property of each annotation in accordance with the setting of a dialog box or a menu as in the related art.

Figure 10:
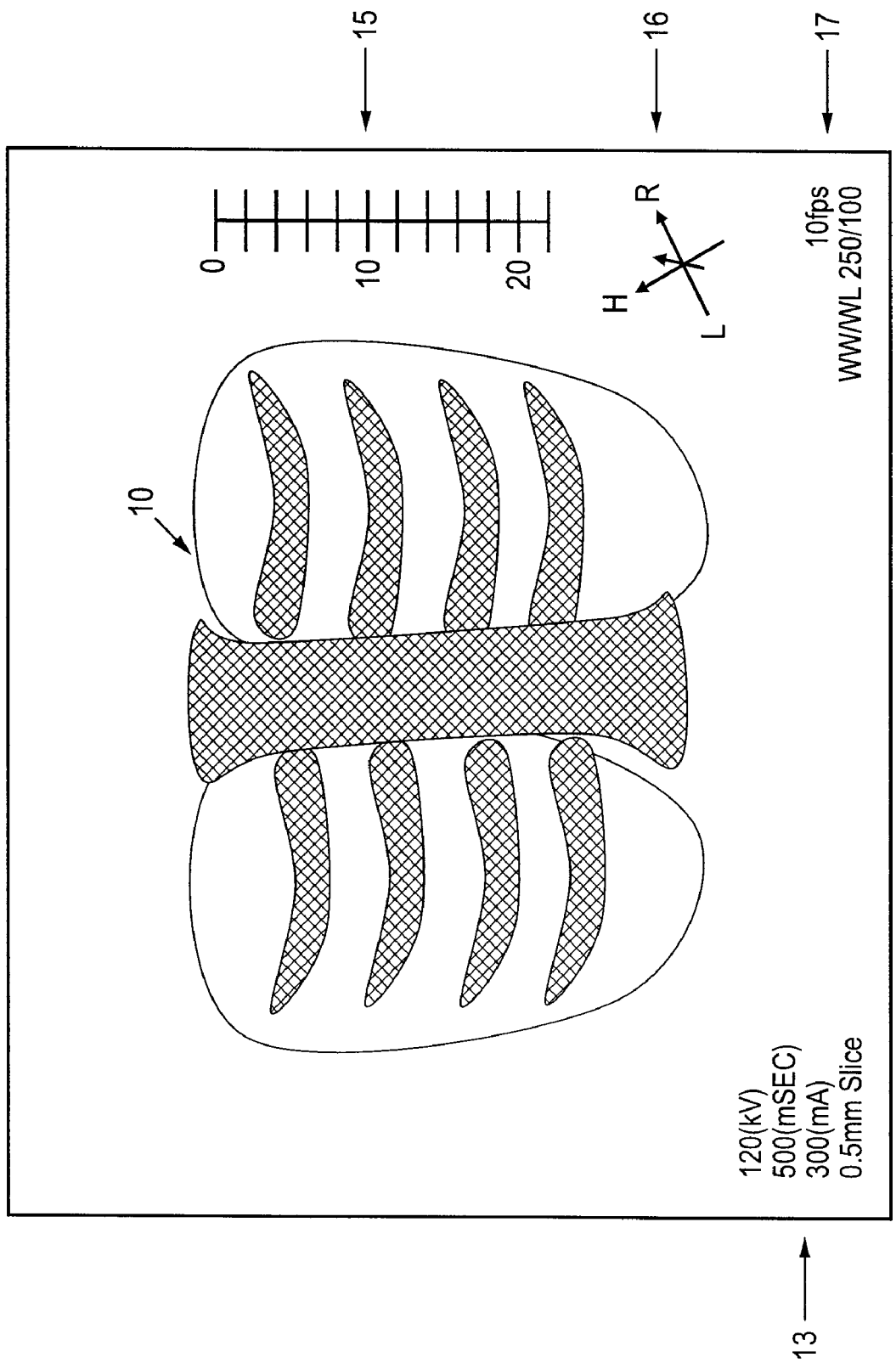
FIG. 10 is a drawing to show a state in which some annotations are drawn.
Figure 11:
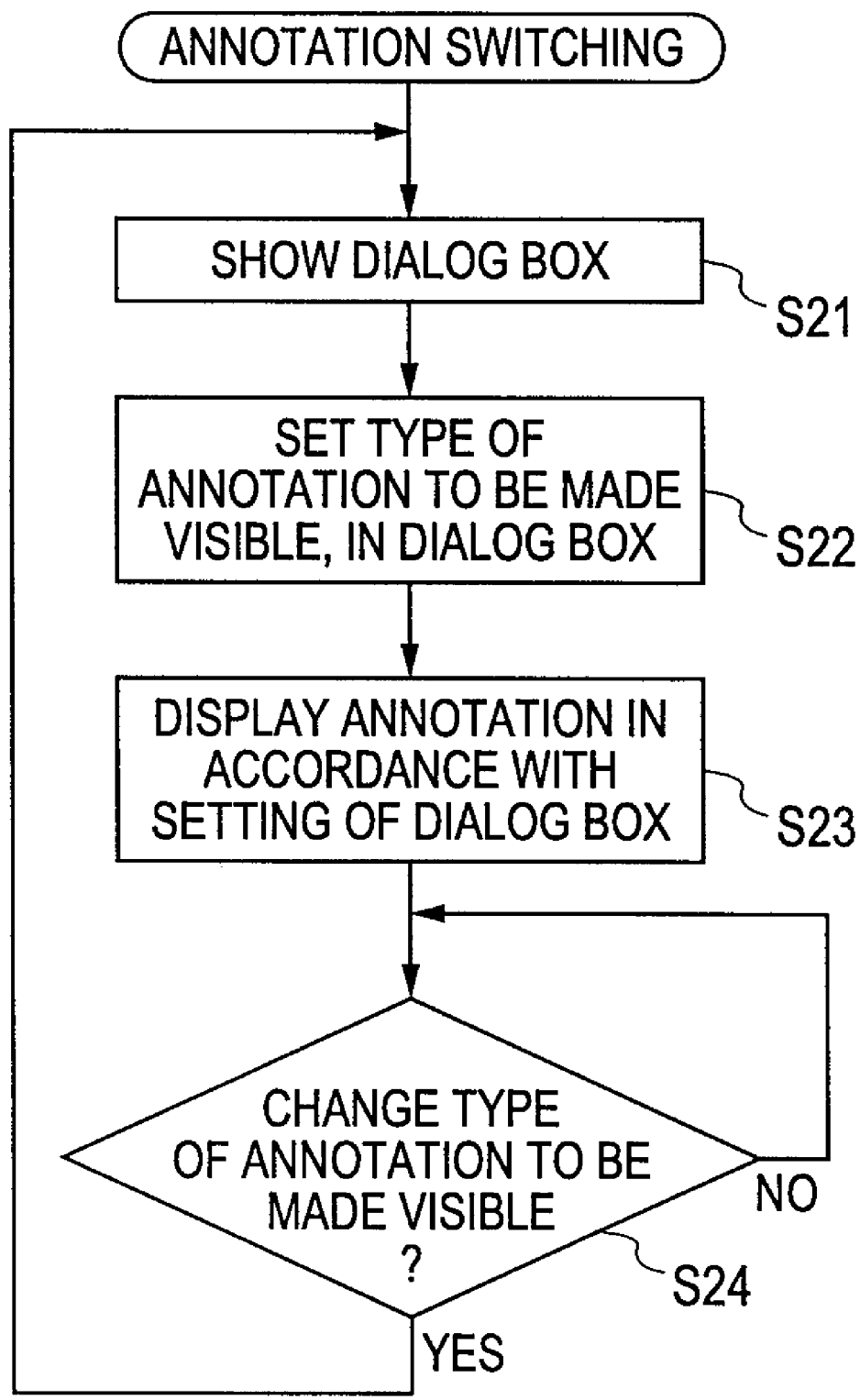
FIG. 11 is a flowchart to describe property value switching processing of annotations in a related art.

FIG. 10 shows a state in which some annotations are made visible. That is, in FIG. 10, the visibility properties of annotations including radiation intensity 13, ruler 15, direction indication 16, and window level WW/WL 17 are made visible and drawn superposed on an image 10 to be diagnosed.

In the image processing method of the embodiment, an example will be discussed wherein if a doctor, radiologic technician, etc., performing a diagnosis while seeing the displayed medical image wants to change the property value of an annotation, he or she presses down the Alt key, whereby the mode is switched to the property value switching mode of drawing all objects. The property value switching mode is kept while the Alt key is hold down.

Figure 1:
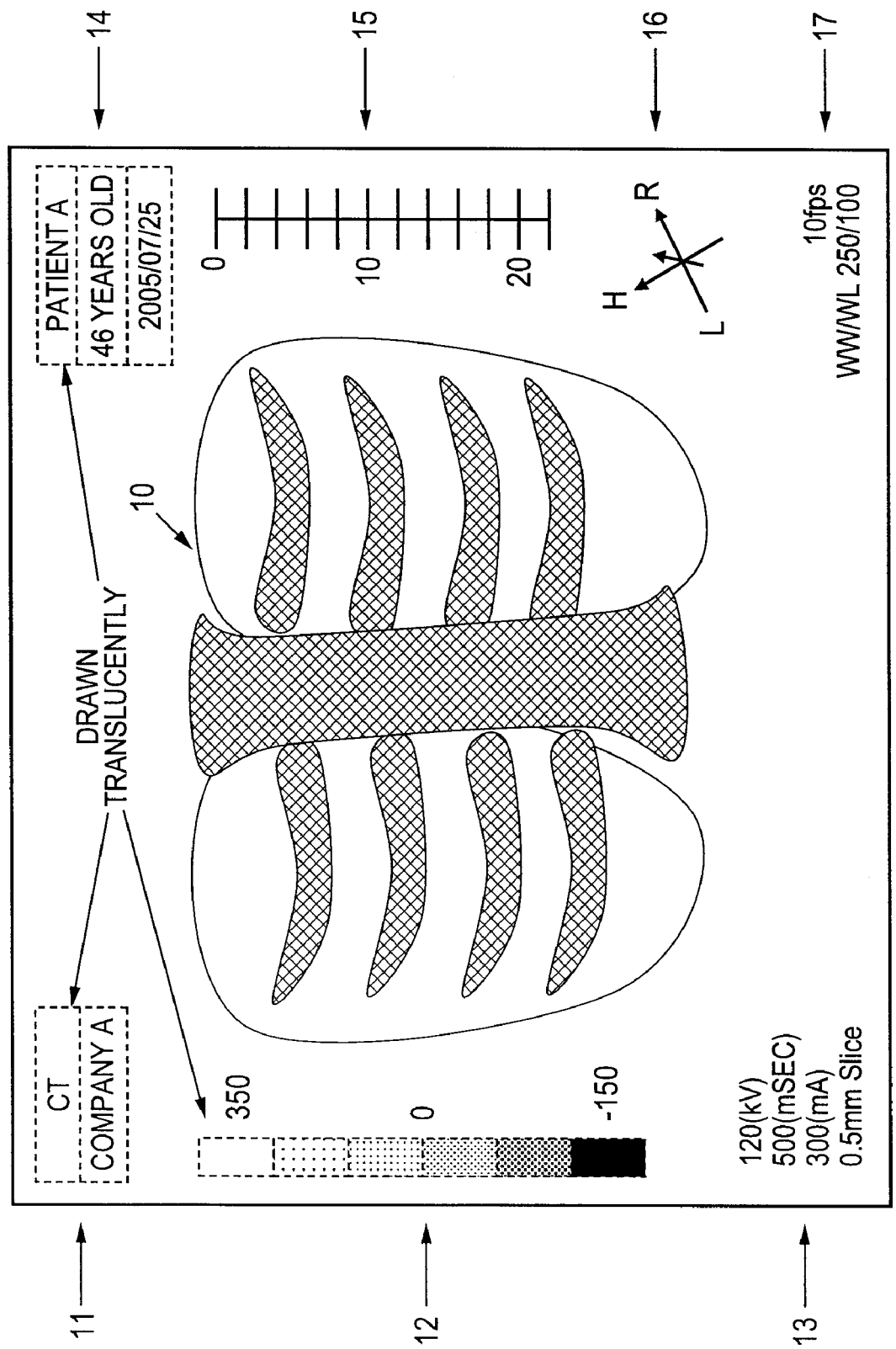
FIG. 1 is a drawing to show a state in a property value switching mode of an image processing method of an embodiment of the invention.

FIG. 1 shows a state in the property value switching mode of the image processing method of the embodiment. When the user presses down the Alt key, the mode makes a transition to the property value switching mode and all annotations are drawn. At this time, the annotations whose visibility property value is invisible are drawn translucently. That is, scanner name 11, color bar 12, and patient name 14 which are not drawn in the normal mode are drawn translucently.

Thus, according to the image processing method of the embodiment, the user presses down the Alt key, whereby the mode is switched to the property value switching mode of drawing all objects, in which case all annotations can be drawn, so that the user can promptly designate the annotation whose visibility property is to be changed and can smoothly conduct a medical diagnosis with an image.

Particularly, in the property value switching mode, an annotation with the visibility property value set to invisible is drawn translucently so that it can be distinguished from an annotation with the visibility property value set to visible, whereby the user can see the visibility properties of the objects at a glance. Therefore, even when the user cannot associate an annotation with its name (text, icon, etc.), the user can set the visibility property value of the annotation by far easily as compared with the related art method in which the user has to designate the annotation by the name in the dialog box or on the menu.

Figure 2:
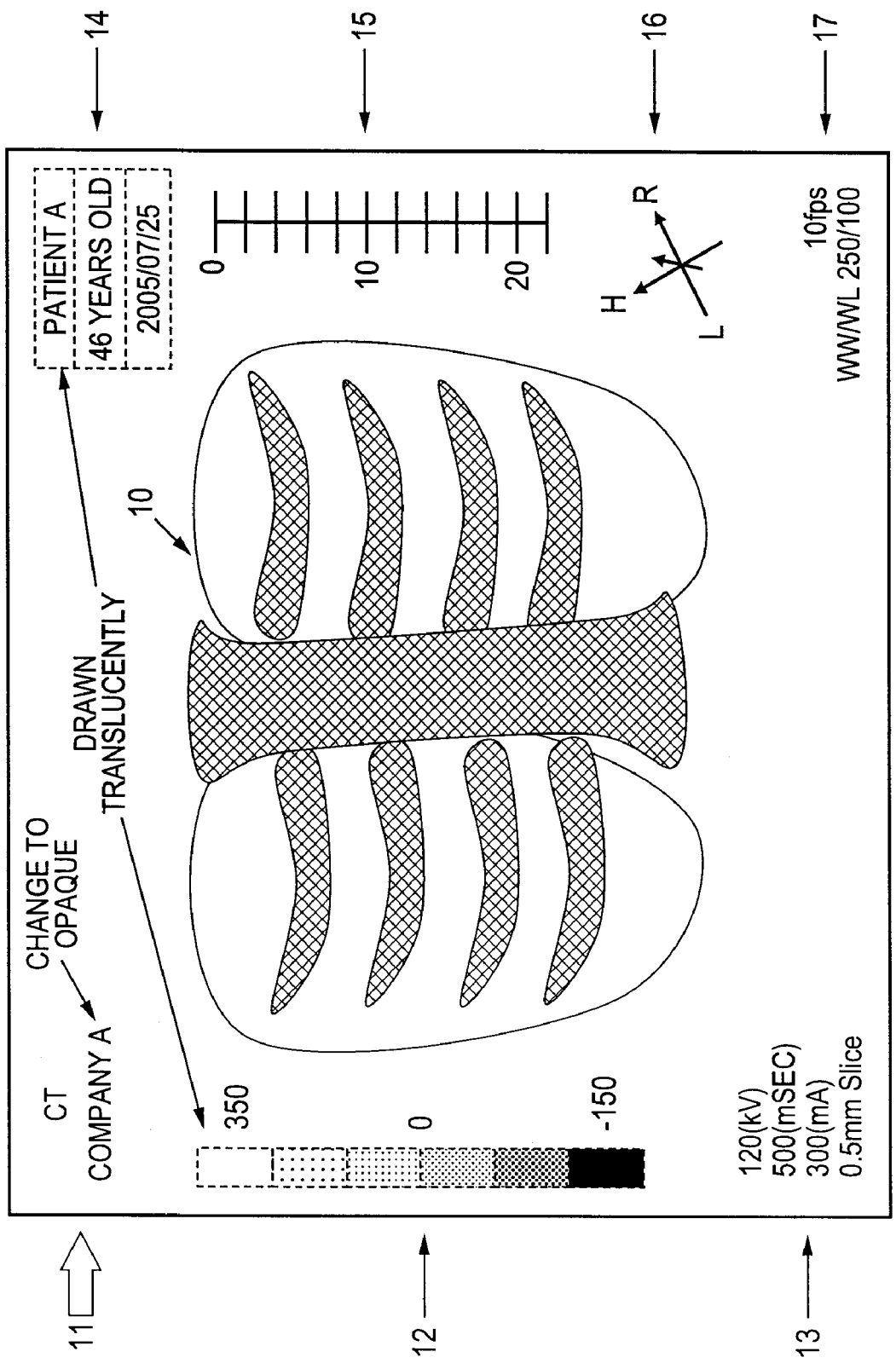
FIG. 2 is a drawing to show a state in which the user clicks on a translucently drawn annotation thereby changing the visibility property from invisible to visible and turning the annotation to opaque in the image processing method of an embodiment of the invention.

Next, in the property value switching mode, to change the visibility property of an annotation, the user designates the annotation with a mouse click, for example. FIG. 2 shows a state in which the user clicks on an annotation to switch the visibility property from invisible to visible. In this case, since the mode is the property value switching mode, the annotation is turned from translucent to opaque according to the change of the visibility property. That is, the user clicks on the annotation (scanner name 11) drawn translucently in the property value switching mode, whereby the annotation is turned from translucent to opaque.

Figure 3:
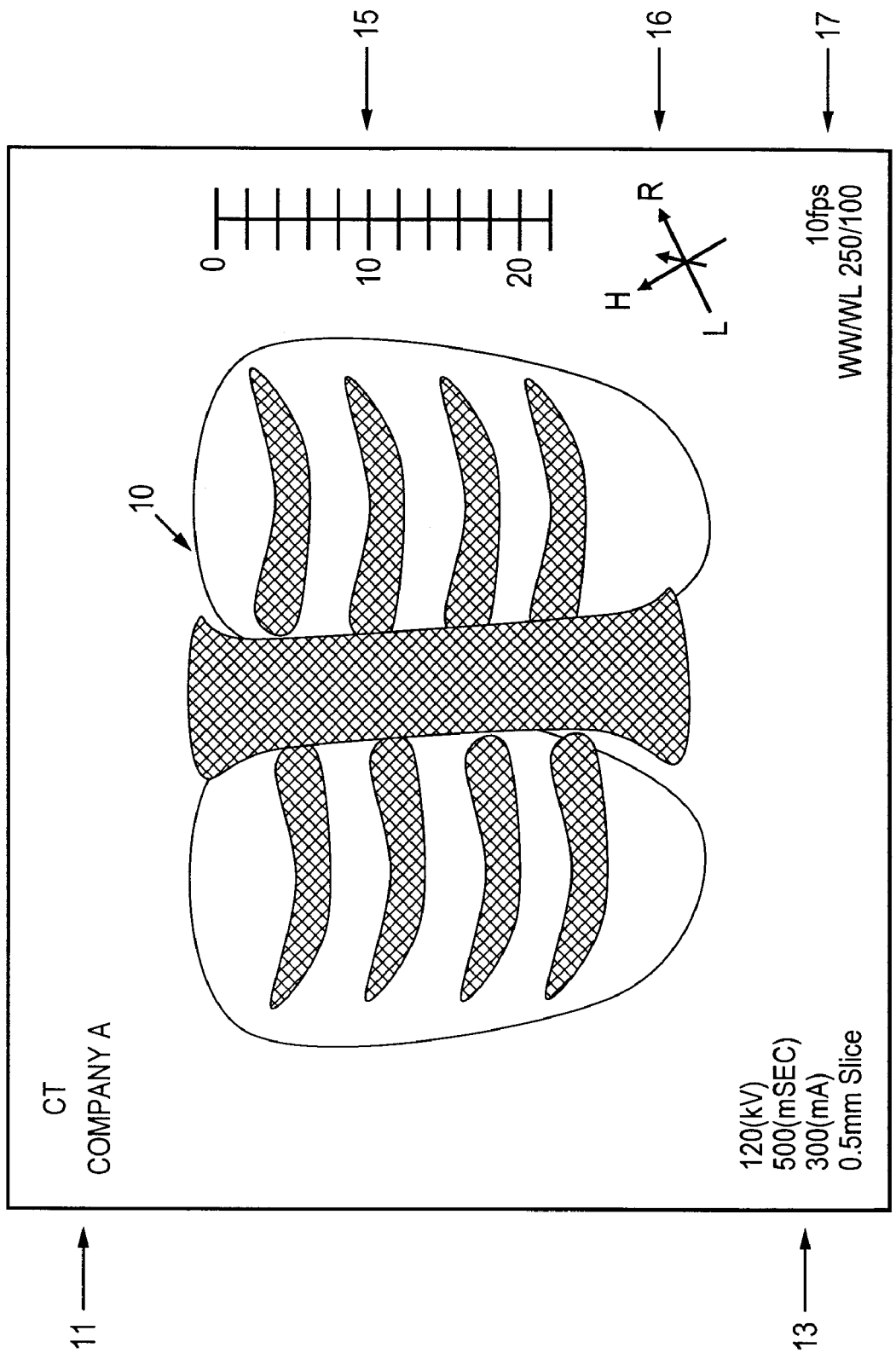
FIG. 3 is a drawing to show a state in which the property value switching mode is completed and the mode is switched to the normal mode in the image processing method of an embodiment of the invention.

Next, the user releases the Alt key, whereby the mode is switched from the property value switching mode to the normal mode. FIG. 3 shows a state in which the property value switching mode is completed and the mode is switched to the normal mode. As the user releases the Alt key, the property value switching mode is completed and the annotations drawn translucently in the property value switching mode (color bar 12 and patient name 14 in FIG. 2) become transparent (invisible) and only the opaque annotations in the visible switching mode are left visible.

Thus, according to the image processing method of the embodiment, the user presses down the Alt key for switching to the property value switching mode, and the object whose visibility property is invisible (not drawn in the normal mode) is drawn translucently, so that the user can promptly designate the object to switch the visibility property value and can smoothly conduct a medical diagnosis with an image.

Example 2

Also in this example, in the normal mode, annotations whose visibility property value is set to visible are drawn and annotations whose visibility property value is set to invisible are not drawn as in the related art (see FIG. 10).

Next, if a doctor, radiologic technician, etc., performing a diagnosis while seeing the displayed medical image wants to change the visibility property value of an annotation, for example, he or she presses the Alt key, thereby switching to the property value switching mode of drawing all objects (see FIG. 1).

In the property value switching mode, the scanner name 11, the color bar 12, and the patient name 14 with the visibility property originally set to invisible (not drawn in the normal mode) are drawn translucently, as shown in FIG. 1.

Figure 4:
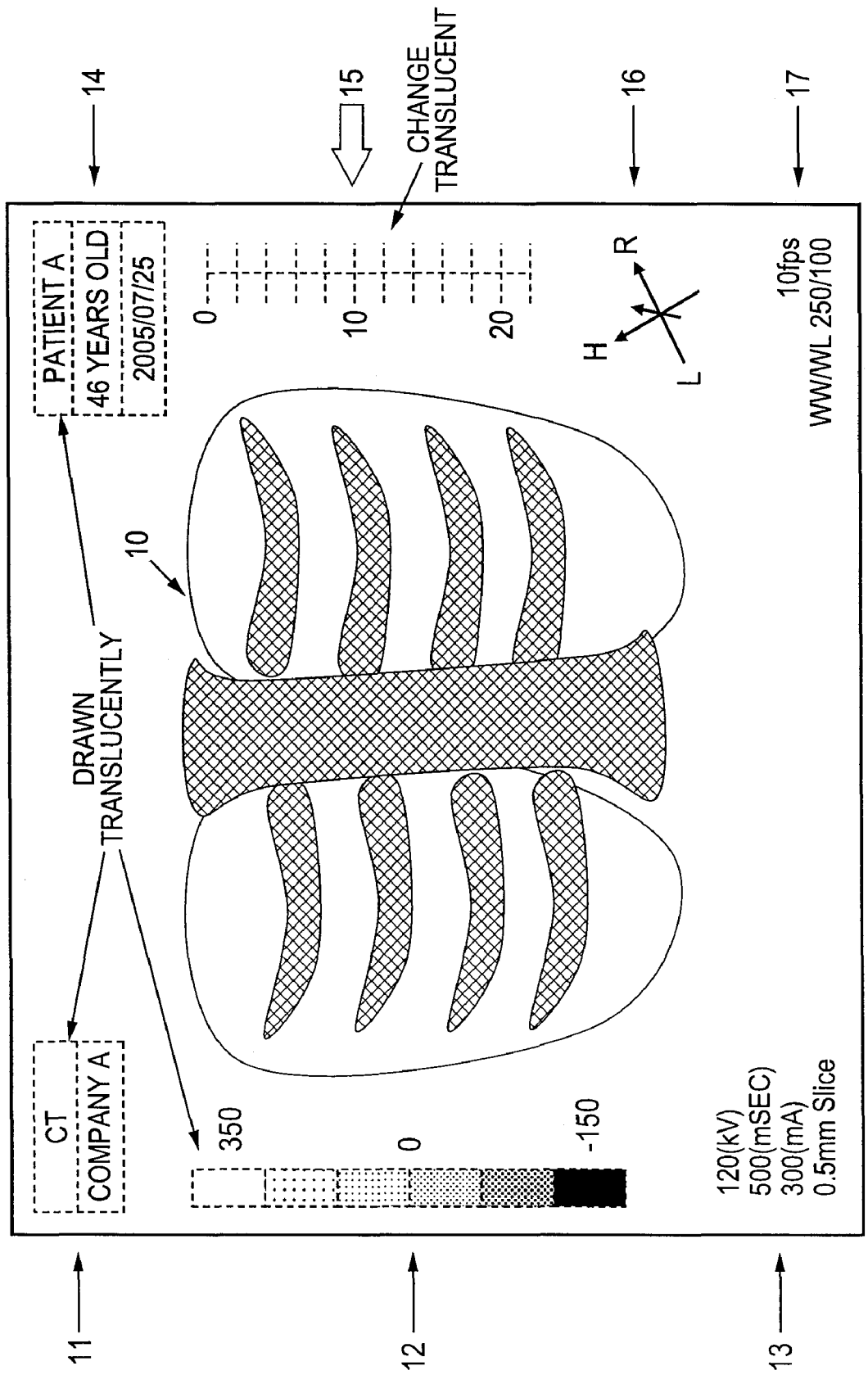
FIG. 4 is a drawing to show a state in which the user clicks on an opaquely drawn annotation thereby changing the visibility property from visible to invisible and turning the annotation to translucent in the image processing method of an embodiment of the invention.

Next, in the property value switching mode, to change the visibility property value of an annotation, the user designates the annotation with a mouse click, for example. FIG. 4 shows a state in which the user clicks on the opaquely drawn annotation for switching the visibility property of the annotation from visible to invisible. In this case, since the mode is the property value switching mode, the annotation is turned from opaque to translucent according to the change of the visibility property value. That is, FIG. 4 shows the state in which the user clicks on the opaquely drawn ruler 15 (object having the visibility property), thereby changing the visibility property of the ruler 15 to invisible. Accordingly, the visibility property of the ruler 15 is switched to invisible.

Figure 5:
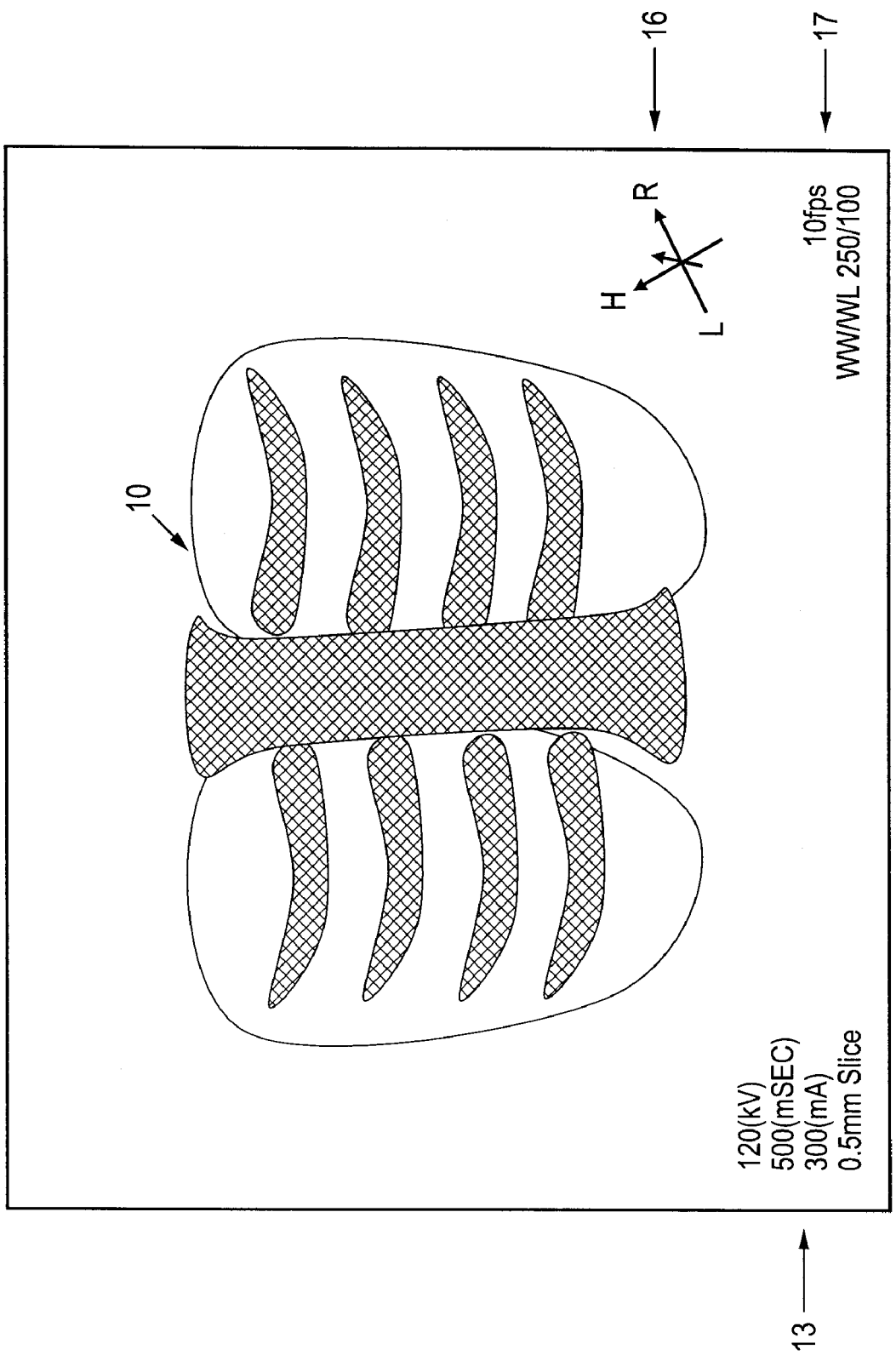
FIG. 5 is a drawing to show a state after the property value switching mode is completed and the mode is switched to the normal mode in the image processing method of an embodiment of the invention.

Next, the user releases the Alt key, whereby the mode is switched from the property value switching mode to the normal mode. FIG. 5 shows a state after the property value switching mode is completed and the mode is switched to the normal mode. As the user releases the Alt key, the property value switching mode is completed and the annotations drawn translucently in the property value switching mode (apparatus name 11, patient name 14, and ruler 15 in FIG. 4) become transparent (invisible).

Thus, according to the image processing method of the embodiment, all annotations are drawn in the property value switching mode and the user can change the visibility property value of the object whose visibility property value is to be changed simply by clicking on the object, so that the user can smoothly conduct a medical diagnosis with an image.

Figure 6A:
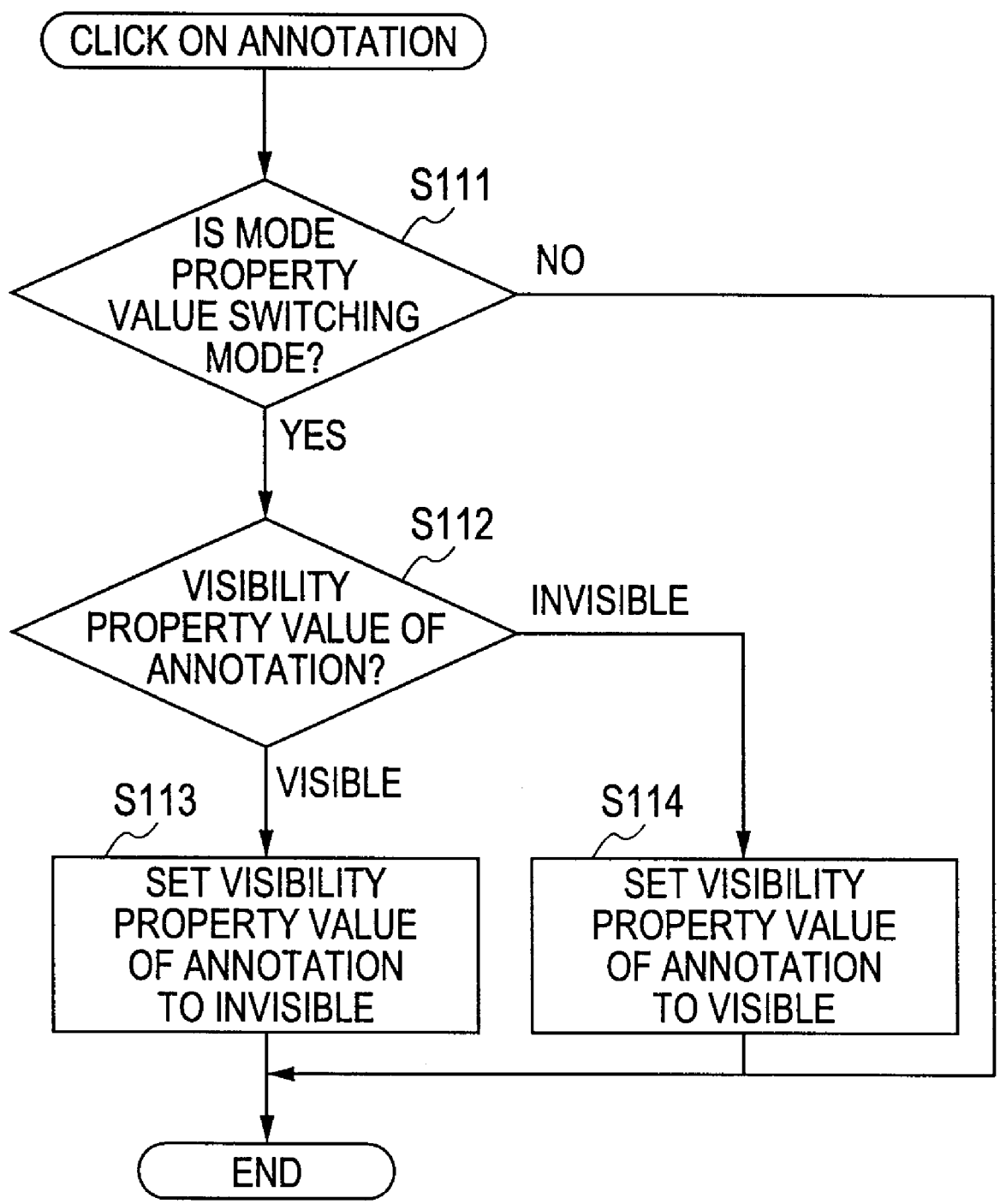
FIG. 6A is a flowchart to describe property value switching processing of an annotation in the image processing method of an embodiment of the invention.
Figure 6B:
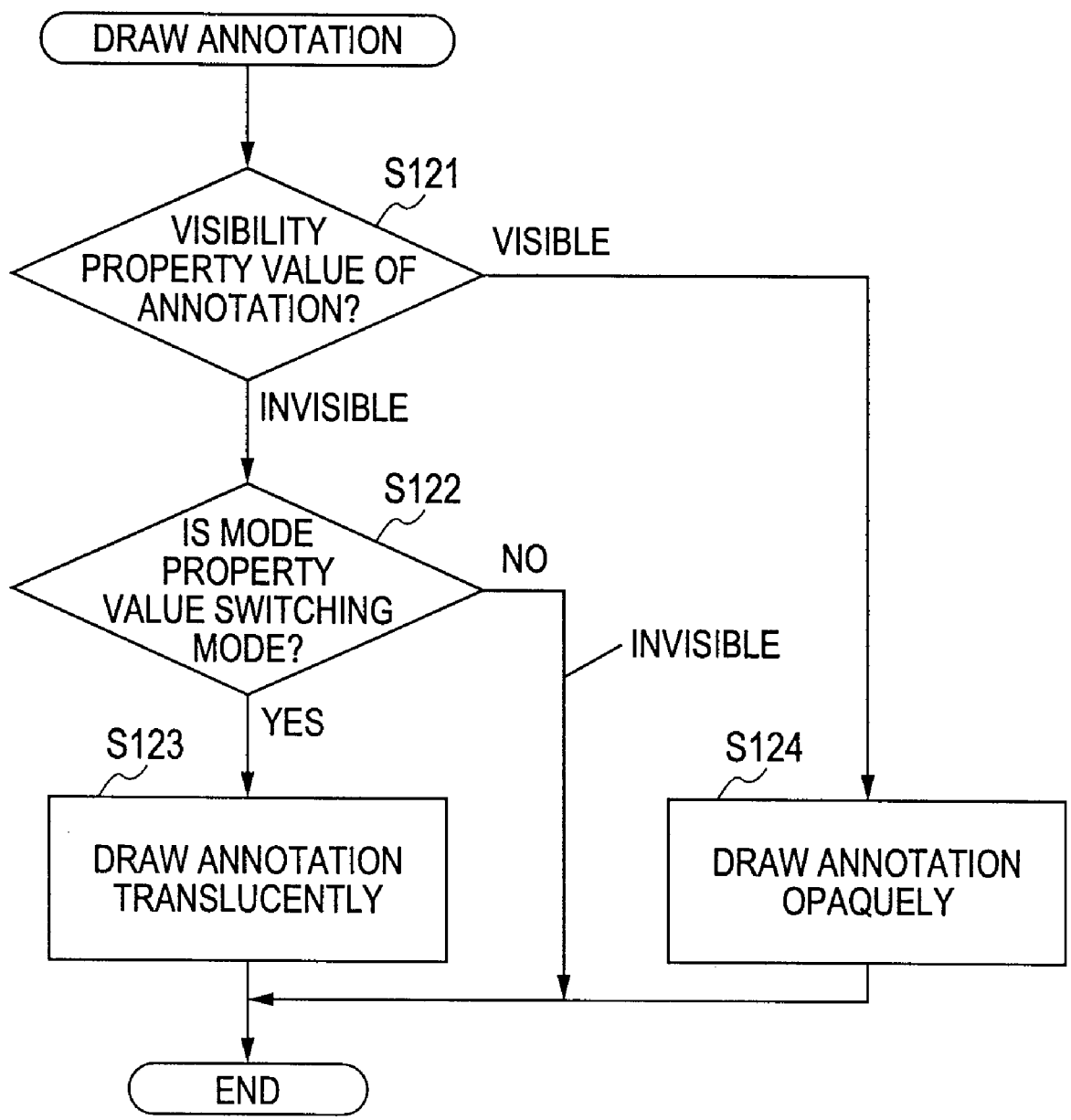
FIG. 6B is a flowchart to describe annotation drawing processing in the image processing method of an embodiment of the invention.
Figure 7:
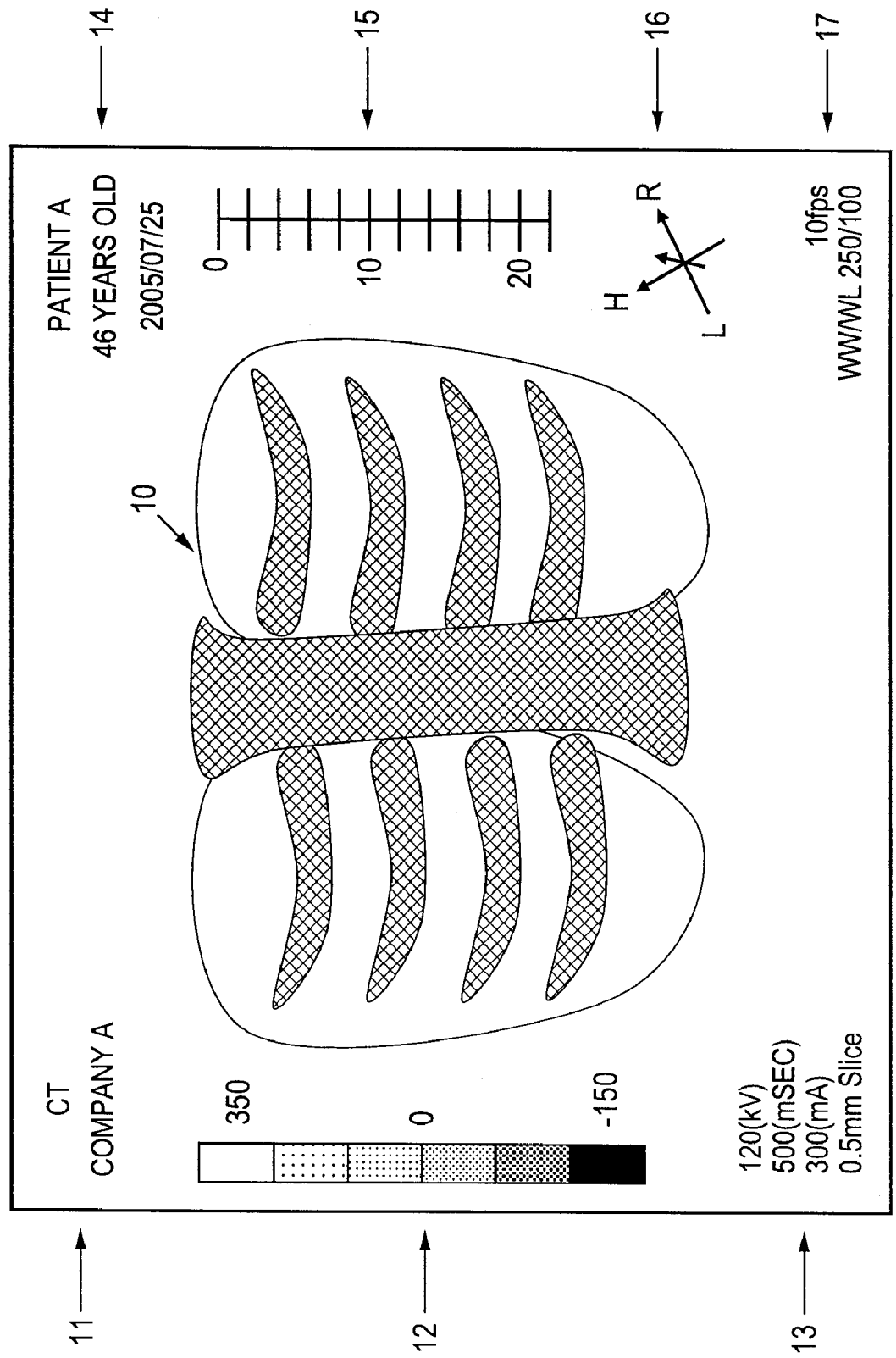
FIG. 7 is a drawing to show a screen displaying a scanned image and annotations superposed on the image for visualizing the state, conditions, etc., of the image in a medical image processing apparatus.
Figures 8, 9:
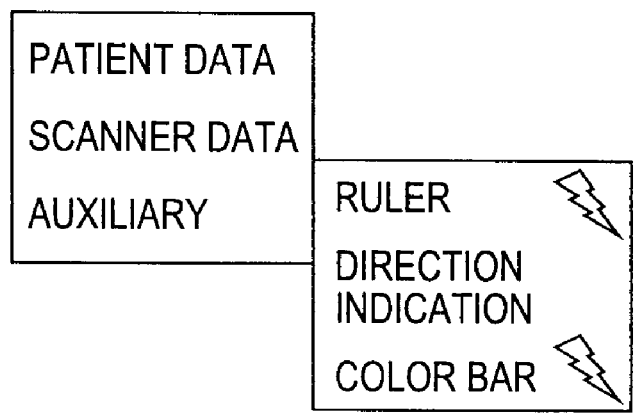
FIG. 8 is a drawing to show the case where visible or invisible of each annotation is set in a dialog box in a related art.
FIG. 9 is a drawing to show the case where visible or invisible of each annotation is set on a menu in a related art.

FIG. 6A is a flowchart to describe property value switching processing of an annotation in the image processing method of the embodiment. FIG. 6B is a flowchart to describe annotation drawing processing in the image processing method of the embodiment. In the image processing method of the embodiment, the visibility property value of each annotation is initially set to visible or invisible using a dialog box or a menu. The initial visibility property value may also be set to a preset value suitable for each image type. The visibility property value at the previous job completion time may also be restored.

The property value switching processing of an annotation will be discussed with FIG. 6*a*. If the user clicks on an annotation, whether or not the mode is the property value switching mode is determined (step S111). If the mode is the property value switching mode (YES at step S111), whether the value of the visibility property value of the annotation is visible or invisible is determined (step S112). If the visibility property value of the annotation is visible, the visibility property value of the clicked annotation is set to invisible (step S113). On the other hand, if the visibility property value of the annotation is invisible, the visibility property value of the clicked annotation is set to visible (step S114). If the mode is not the property value switching mode (NO at step S111), the processing is ended.

Next, the annotation drawing processing will be discussed with reference to FIG. 6B. To draw an annotation, whether the value of the visibility property value of the annotation is visible or invisible is determined (step S121). If the visibility property value is invisible, whether or not the mode is the property value switching mode is determined (step S122). If the mode is the property value switching mode (YES at step S122), the annotation is drawn translucently (step S123). On the other hand, if the mode is not the property value switching mode (NO at step S122), the processing is ended without drawing. If the visibility property value of the annotation is visible at step S121, the annotation is drawn opaquely (step S124).

Thus, according to the image processing method of the embodiment, the user presses down the Alt key, whereby the mode is switched to the property value switching mode and all annotations are drawn, so that the user can promptly designate an annotation whose visibility property value is to be changed and can smoothly conduct a medical diagnosis with an image.

To switch between the normal mode and the property value switching mode, the user presses the Alt key by way of example. However, the property value switching mode may be entered while any key is pressed; a plurality of key inputs may be used in combination; or the mode may be switched each time a key is hit. The mode may be switched by operating a pointing device such as a mouse to designate an icon, a check box, or a button on the screen. Instead of icon, etc., a middle button, for example, of a pointing device such as a mouse may be used. Any other input device may be used. The above-mentioned items may be used in combination.

The objects during the property value switching mode are drawn either opaquely or translucently so that they are distinguished from each other by their visibility property value. Further, they may be drawn in different colors or sizes responsive to the visibility properties value, or may be drawn with or without a predetermined character or symbol superposed, so that they are distinguished from each other by their visibility property value.

The objects to which the visibility property value switching of the present invention is applied include a scroll bar and a dial for screen operation, an image operation GUI for image rotation, cross-section position control, etc., as well as the annotations. For example, a direction input GUI having almost the same appearance as the direction indication notation may exist. If the user drags a mouse on the direction input GUI, the image is rotated. A window level WW/WL input GUI having almost the same appearance as the window level WW/WL notation may exist. If the user drags a mouse on the WW/WL input GUI, the window level is changed. Since the user can operate each of the image operation GUIs only when the visibility property value of the image operation GUI is visible, the screen can also be prevented from being flooded with unnecessary image operation GUIs incurring erroneous operation.

The objects to which the visibility property value switching of the present invention is applied include image diagnosis objects such as a path set for volume rendering data, the voxel measurement result, a 3D mesh, a mask, for example, a path representing the center of a blood vessel, CT value measurement for measuring calcification of a tumor, a 3D mesh for representing organ contours, and a mask assigned to each extracted organ region as well as the annotations. Particularly, since the image diagnosis objects are created arbitrarily by the user while diagnosing, they are hard to be given easy-to-understand names dynamically and are not appropriate for setting visible or invisible in the dialog box or on the menu, but can be easily operated if the present invention is used.

Further, in the embodiment of the invention, the case where the visibility property is switched is described. The invention can also be applied to the case where operation of an object not drawn on the screen or an object hard to point to although it is drawn on the screen is facilitated.

For example, the object being animated at high speed can be stopped and operated as the property value switching mode is set. An object that is drawn small can be changed to a size easy to point to for operation as the property value switching mode is set. An object drawn behind another object can be moved to the front for operation as the property value switching mode is set.

A plurality of objects previously associated with each other can be set to visible or invisible collectively in one image. A plurality of objects previously associated with each other can be set to visible or invisible collectively in a plurality of windows (images). The visibility property value of one object drawn across a plurality of windows (images) may be changed collectively.

The visibility properties value may include any other property value as well as visible and invisible. For example, scale-down visualization value may be further included in the visibility property value, so that an object low in importance can be scaled down on the drawing and made inconspicuous. Furthermore, to facilitate the setting of the visibility property value, the visibility property value of the object may be circulated as "visible, invisible, scale-down, visible . . . ," each time the user clicks on the object.

One object may hold a plurality of visibility properties. In this case, a plurality of property value switching modes are used corresponding to each of the plurality of visibility properties. When in one of the property value switching modes, objects are drawn regardless of the visibility property value corresponding to the current property value switching mode, but objects with at least one of other visibility properties set to invisible are not drawn. In doing so, the visibility properties are put into a hierarchy and are multiplexed, enabling the user to perform more complicated operation.

In the examples described above, the object whose visibility property is invisible in the property value switching mode is drawn translucently, but any drawing manner may be adopted provided that the object whose visibility property value is invisible can be distinguished from the object whose visibility property value is visible. For example, dotted line display, drawing using different fonts, drawing using different colors, and the like are possible.

An article of the invention can be also achieved by a computer readable medium in which a program code (an executable program, an intermediate code program, and a source program) according to the above described image processing method is stored so that a computer can read it, and by allowing the computer (or a CPU or an MCU) to readout the program (software) stored in the storage medium and to execute it.

The computer readable medium includes, for example, a tape-type medium, such as a magnetic tape or a cassette tape, a disc-type medium including a magnetic disc, such as a floppy (a registered trademark) disc or a hard disc, and an optical disc, such as CD-ROM/MO/MD/DVD/CD-R, a card-type medium, such as an IC card (including a memory card) or an optical card, and a semiconductor memory, such as a mask ROM, an EPROM, an EEPROM, or a flash ROM.

Further, the computer may be constituted such that it can be connected to a communication network, and the program may be supplied thereto through the communication network. The communication network includes, for example, the Internet, the Intranet, an intranet, an extranet, a LAN, an ISDN, a VAN, a CATV communication network, a virtual private network, telephone lines, a mobile communication network, and a satellite communication network. A transmission medium for constituting the communication network includes, for example, wire lines, such as IEEE1394, USB, power lines, cable TV lines, telephone lines, and ADSL lines, infrared rays, such as IrDA or a remote controller, and wireless lines, such as Bluetooth (a registered trademark), 802.11 Wireless, HDR, a mobile communication network, satellite lines, and a terrestrial digital broadcasting network. In addition, the program may be incorporated into carrier waves and then transmitted in the form of computer data signals.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing method comprising:
    displaying a medical image including a plurality of objects each having a visibility property whose value can be at least visible or invisible;
    switching a mode from a normal mode in which the object is drawn in accordance with the visibility property, to a property value switching mode in which the object is drawn regardless of the visibility property;
    accepting designation of any of the objects in the property value switching mode; and
    switching the visibility property of the designated object, wherein during the property value switching mode, the objects are displayed with an indication corresponding to the visibility property being set.

2. The image processing method as claimed in claim 1, wherein the designation of the object in the property value switching mode is performed with a pointing device.

3. The image processing method as claimed in claim 1, wherein the objects include an annotation.

4. The image processing method as claimed in claim 1, wherein the objects include an image operation GUI.

5. The image processing method as claimed in claim 1, wherein the objects include an image diagnosis object.

6. The image processing method as claimed in claim 1, wherein while a predetermined key is held down, the mode is kept in the property value switching mode.

7. The image processing method as claimed in claim 1, wherein the mode is switched between the property value switching mode and the normal mode each time a predetermined key is pressed down.

8. The image processing method as claimed in claim 1, wherein the mode is switched between the property value switching mode and the normal mode according to an input through a GUI.

9. The image processing method as claimed in claim 1, wherein each of the objects is drawn in a degree of transparency according to the visibility property being set.

10. The image processing method as claimed in claim 9, wherein each of the objects is drawn in a color according to the visibility property being set.

11. The image processing method as claimed in claim 9, wherein each of the objects is drawn in a display size according to the visibility property being set.

12. The image processing method as claimed in claim 1, wherein during the property value switching mode, the objects are drawn with or without a predetermined character or symbol, so that the objects are distinguished from each other according to the visibility property value being set.

13. A computer readable medium having a program including instructions for permitting a computer to perform image processing, the instructions comprising:
    displaying a medical image including a plurality of objects each having a visibility property whose value can be at least visible or invisible;
    switching a mode from a normal mode in which the object is drawn in accordance with the visibility property, to a property value switching mode in which the object is drawn regardless of the visibility property;
    accepting designation of any of the objects in the property value switching mode; and
    switching the visibility property of the designated object, wherein during the property value switching mode, the objects are displayed with an indication corresponding to the visibility property being set.

14. A computer readable medium as claimed in claim 13, wherein during the property value switching mode, the objects are drawn with or without a predetermined character or symbol, so that the objects are distinguished from each other according to the visibility property value being set.

* * * * *